United States Patent Office 3,562,856
Patented Feb. 16, 1971

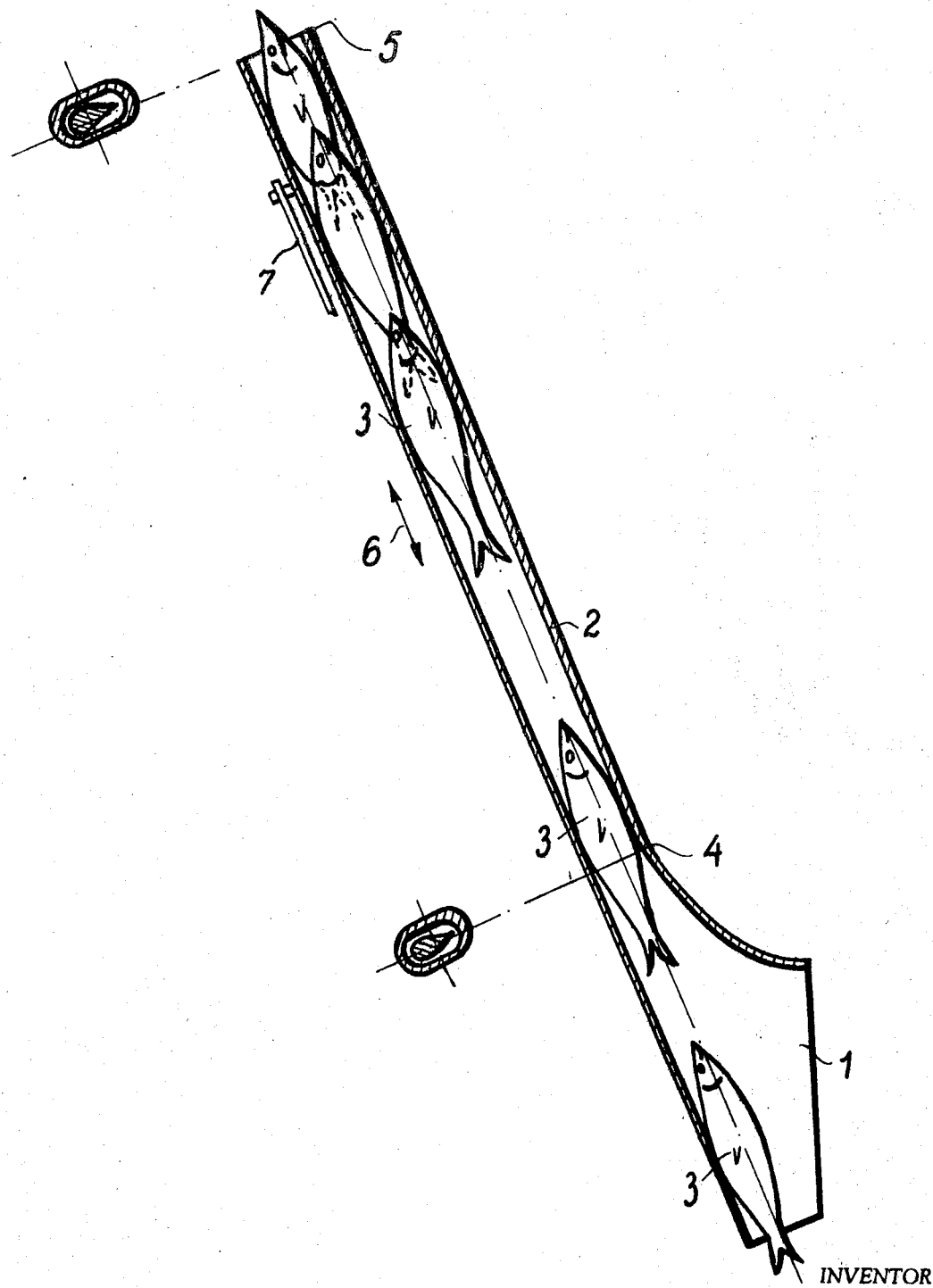

3,562,856
MAGAZINE TUBE FOR FISH
Jan Bergh Eriksen, Bronngaten, Norway, assignor to Trio Fabrikker A/S de Forenede norske Laase-og Beslagfabriker, Stavanger, Norway
Filed Apr. 1, 1968, Ser. No. 717,593
Claims priority, application Norway, Apr. 21, 1967, 167,835
Int. Cl. A22c 25/08
U.S. Cl. 17—55                                1 Claim

ABSTRACT OF THE DISCLOSURE

Magazine tube for fish for use in connection with fish processing machinery in which the tube has an oval cross-section and to which a reciprocating motion is imparted, wherein the tube is slightly conical expanding from the input end towards the output end.

---

This invention relates to a magazine tube for fish for use in connection with fish processing machinery in which the tube has an oval cross-section and to which is imparted a reciprocating motion.

Magazine tubes of this type are used for the transportation and temporary storage of fish between consecutive operations during the processing of the fish. Certain types of fish have a higher coefficient of friction than others and can, in spite of the force of gravity and the reciprocating movement, nevertheless get stuck in the magazine tube.

The object of this invention is to obviate fish getting stuck in the tube, and this is achieved, according to the invention, by the tube being slightly conical, expanding from the input end towards the output end. In this manner, the fish will pass the narrowest part at the input end because here it has a certain kinetic energy and, as the cross-section becomes larger, the force of gravity and/or the reciprocating movement in all cases will be sufficient to set the fish in motion again even after temporary storage in the tube.

An embodiment of the invention will be explained in more detail with reference to the drawing which shows a longitudinal section through a magazine tube according to the invention.

The magazine tube in the drawing has an input funnel 1 leading into, and forming an integral part of the smallest cross-section 4 of the tube 2. As indicated by the arrow 6, a reciprocating motion is imparted to the magazine tube by a conventional mechanism for that purpose, indicated at 7. The tube has an oval cross-section as shown by sections 4 and 5, and cross-section 5 is larger than cross-section 4, in that the tube is slightly conical expanding from the input end with cross-section 4, towards the output end with cross-section 5 the major axis of the oval being vertical in each instance, as shown in the drawing. On account of this, the fish 3, after having passed the smallest cross-section 4 will, with the help of its kinetic energy, be unable to get stuck in the tube, but will slide through this with the help of the reciprocating movement of the tube.

Having described my invention, I claim:
1. A magazine tube for fish for use in connection with fish-processing machinery, the tube being downwardly inclined from an input end to an output end and having an oval cross section throughout the entire length thereof, the major axis of the oval being vertical and increasing in length from the input end to the output end of the tube, the tube being slightly conical and expanding from the input end toward the output end, and means for reciprocating the tube lengthwise.

References Cited

UNITED STATES PATENTS

| | | | |
|---|---|---|---|
| 1,893,903 | 1/1933 | Mullins | 17—55 |
| 1,947,011 | 2/1934 | Karthäuser | 193—2 |
| 2,258,516 | 10/1941 | Richardson | 193—2 |
| 3,209,893 | 10/1965 | Trautwein | 193—2X |
| 3,229,326 | 1/1966 | Eriksen | 17—55 |

LUCIE H. LAUDENSLAGER, Primary Examiner

U.S. Cl. X.R.

193—2